Aug. 1, 1967 A. FENER 3,334,005
HEAT SEALING APPARATUS FOR MAKING CONTOURED SEAMS
Filed Feb. 12, 1965

INVENTOR,
Alfred Fener,
BY
ATTORNEY.

United States Patent Office 3,334,005
Patented Aug. 1, 1967

3,334,005
HEAT SEALING APPARATUS FOR MAKING
CONTOURED SEAMS
Alfred Fener, 422 Beach 146th St.,
Neponsit, N.Y. 11694
Filed Feb. 12, 1965, Ser. No. 432,243
8 Claims. (Cl. 156—583)

The present invention relates to electrical heat sealing apparatus of the thermal impulse type including a sealing bar, a pressure bar and reciprocating means for said bars for applying pressure on a pair of layers of thermoplastic film interposed between them. The sealing bar includes a wire, heated electrically to accomplish the seam and may be further employed to sever the work as for example is set forth in my Patent No. 2,961,031, to which reference is made for information as to the details of structure of this class of apparatus. In particular, this invention concerns apparatus to effect seams which are not straight. It is therefore evident that the sealing and severing wire in my apparatus is of any desired contour lying in one or more planes.

Devices for effecting a straight line seam, utilize a straight wire, usually held in tension. Such method of mounting could not be used for a bent wire, and so it has been proposed to anchor it at its ends and at spaced points therealong by spike pins welded to its underside and fixed in the sealing bar body. Of course, the sealing wire and its anchoring elements are insulated from said body, to confine the heating current to the wire. But such construction is objectionable because the seam made on the work is not "clean." At anchorage regions, not only is seam appearance different, but seam strength is weaker than in the lengths between such regions.

It is therefore the principal object of this invention to provide novel and improved constructions at the anchorage regions of the shaped seaming wire, so the seam effected is uniform throughout its length, in strength and appearance.

A further object thereof is to provide novel and improved constructions in sealing bars of the character described and having the mentioned attributes, which are simple in structure, reasonable in cost to manufacture and efficient in carrying out the purposes for which they are designed.

Other objects and advantages will become apparent as this disclosure proceeds.

I have discovered that the anchoring pins or spikes act in the manner of heat-dissipating fins and "bleed" the heat from the wire regions they are at, thereby creating cold spots in the wire, which cause the aforesaid imperfections in the work performance.

For the practice of this invention, I provide means to avoid such heat dissipations at spike regions, by constructions offering heat transfer to said spikes, to counteract the "heat bleeding" tendency of said spikes. Essentially, the spikes are maintained constantly in heated condition by heat which is caused to accumulate as residual heat in the sealing bar at spike locations and/or by auxiliary heating means for each spike, which preferably is controllable so the spikes draw no heat from the sealing wire.

In the accompanying drawing forming part of this specification, similar characters of reference indicate corresponding parts in all the views.

Figure 3:
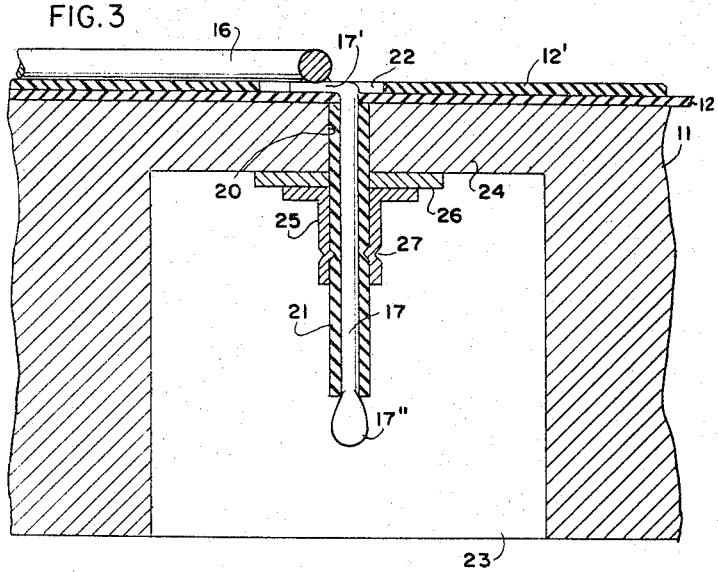
FIG. 3 is a fragmentary magnified section taken at line 3—3 in FIG. 2.
Figure 4:
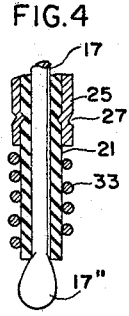

FIG. 4, drawn to the same scale as FIG. 3, shows part of FIG. 3 but of modified construction wherein an electric heater coil is used to heat a spike.

Figures 5, 6, 7:
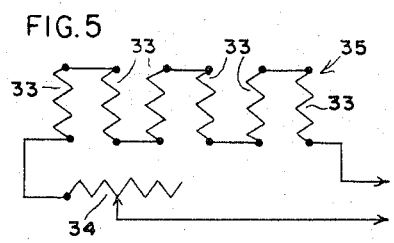

FIG. 5 is a wiring diagram of the circuit including a heater coil for each of the spikes respectively.

FIG. 6 is a fragmentary perspective view drawn to an enlarged scale, showing another form of spike secured to the sealing wire.

FIG. 7 is a diagrammatic top plan view of a wire bent into a form where the anchoring spikes therefor are not at the bends in said wire which serves as the sealing means.

In the drawing, the numeral 10 generally designates a sealing bar comprising a base 11 formed of a metal of high heat conductivity, such as brass or aluminum, having two thin layers 12, 12' of substantially non-compressible dielectric strip material thereon. On the upper layer 12', between the fixed terminals 14 and 15 carried on the insulative bar ends 32, 32' respectively, there is an elongated sealing and cutting wire 16 which is bent in any desired contour to lie flat in a single plane, which in the embodiment shown, is a horizontal plane. This wire, made of Nichrome, has a plurality of anchoring pins or spikes 17, welded in spaced relation, to and extending downwardly from its underside. The diameter of said wire 16 is much larger than the combined thicknesses of the layers 18, 19 of thermoplastic film to be operated on and the size of the wire of which said spikes are formed, is preferably less than that of the sealing wire 16. The insulating layers 12, 12' are preferably of Fiberglas fabric impregnated with Teflon.

The spikes 17 are located at such positions along the wire 16, so that the contour of said wire will be maintained. Each spike 17 is fixed in a hole 20 in the sealing bar base 11, wherein it is surrounded by a dielectric tube 21, and its bentover thinned top end piece 17', lies in a depression offered by an opening 22 through the layer 12' and rests on the layer 12. Said hole 20 has a counterbore 23 from the bottom of said base 11, which is comparatively of large diameter and depth, so the hole 20 is through a compartively thin part 24 of the base body. For each spike 17, there is a metal eyelet 25 on its tube 21, which bears against the underside of a washer 26 which is against the seat of said counterbore; said eyelet being clinched at 27 to maintain the assembly; all parts being tightly fitted throughout. The lower end of each spike is flattened as at 17" to bear against the bottom end of its associated tube 21.

The sealing bar 10 is mounted for cooperation with a pressure bar generally denoted by the numeral 28, comprising a metal base 29 having a thick layer of a suitable rubber-like material, such as silicon rubber thereon. A relatively thin layer 30 of the instance, Teflon-impregnated Fiberglas fabric, is cemented or otherwise secured to the layer of rubber 31 and constitutes the pressure-applying face of the bar 28. Said pressure bar is mounted for movement towards and away from the sealing bar 10; means for carrying out such movement being indicated as including the member 26 which carries said pressure bar. The terminals 14 and 15 of the sealing and cutting wire 16, are electrically connected with the respective ends of the secondary winding of a step-down transformer, not shown, for actuation by a circuit and controls in the manner set forth in detail in my said patent and in many other patents well know to those versed in this art, so further illustration and explanation thereof is believed unnecessary.

Every time the wire 16 is heated, some heat passes to the base 11, but the thin part 24 at each spike region will heat up faster than the thicker part of the base, so a substantial residual heat will accumulate in each of said thin parts which will act to maintain the spikes hot, which spikes soon after commencement of operation of the apparatus, will lose their cooling effect on the wire 16 at the regions they are attached to said wire.

Since keeping the spikes hot is the requisite for the practice of this invention, the heat supply therefor may be furnished by having an electrical heating coil 33 on or in the vicinity of each of the spikes 17 respectively as the sole spike-heating means, or in conjunction with the residual heat mentioned. The current through such heater coils is preferably regulated by a rheostat 34 in their circuit 35, to assure that the "heat-bleeding" by the spikes 17 is exactly neutralized.

In FIG. 6, another way is shown for attaching a spike to the sealing wire. Here, the spike 17' is a straight piece of wire welded at one end directly to the sealing wire 16' and extending laterally thereof. In FIG. 7, the bends are such as shown at 38, and the spikes at 39, 40, are at suitable locations which are not at the bends and yet are sufficient to maintain the wire shape.

Figure 1:
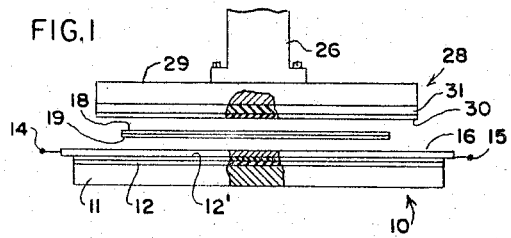
FIG. 1 is a fragmentary elevational view showing parts in section, of a heat sealing and severing apparatus embodying teachings of this invention.
Figure 2:
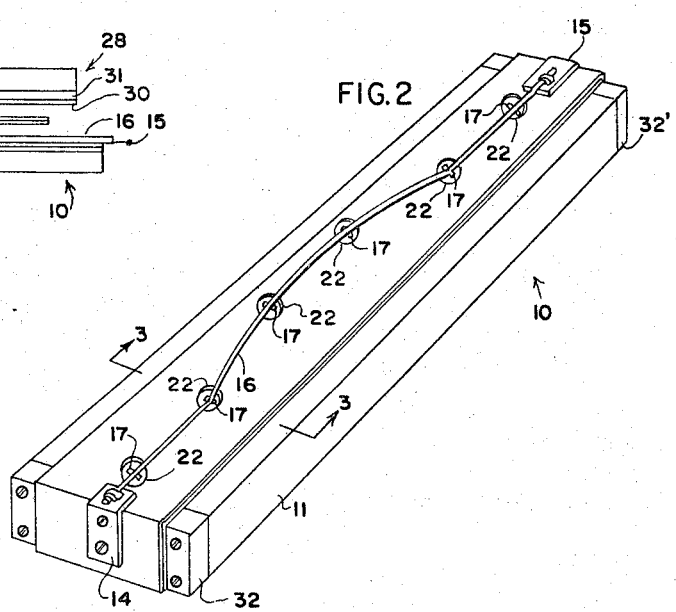
FIG. 2 is an enlarged perspective view showing the sealing bar of said apparatus.
Figure 2A:
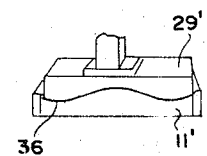
FIG. 2A is a reduced perspective view of a modified form of sealing apparatus.

Although the sealing wire 16, in most installations is in one plane, the sealing apparatus may be as illustrated in FIG. 2A where not only does the wire have its own contour, but it also follows the contour 36 of the sealing bar 11'. In such instance of course, the pressure bar 29' is a counterpart for the sealing bar 11'.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showings herein to indicate the scope of this invention.

I claim:

1. In a heat sealing apparatus of the thermal impulse type, comprising, in combination, sealing and pressure bars positioned opposite each other and mounted for relative movement towards and away from each other, adapted to cooperate on layers of thermoplastic film when interposed between said bars, means for relatively moving said bars; said sealing bar including a heat-conductive metal base, a bent sealing wire carried on a surface of said base opposite said pressure bar; said sealing wire lying parallel to said surface and adapted to be heated by passing a pulse of current therethrough and at least one metal spike secured to and extending from said wire into a hole in said base; said wire and spike being electrically insulated from said base and a first means to supply heat to said spike while said wire is being heated and unheated.

2. A heat sealing apapratus as defined in claim 1, including a second means to adjust the heat supply offered by first said means.

3. A heat sealing apparatus as defined in claim 1, wherein said first means is afforded by having said base provided with a counterbore to said hole; one opening of said hole being adajcent said wire and its other opening being communicative with said counterbore; said counterbore being such larger than said hole and much deeper than the length of said hole whereby said base is relatively thin in the region around said hole and relatively thick beyond said region.

4. A heat sealing apparatus as defined in claim 1, including a relatively thin dielectric element on said base; said wire lying on said element; said spike having a bent over end piece; said wire lying against and secured to said end piece; said element having a depression in the region where said spike is secured to said wire; said piece lying in said depression.

5. A heat sealing apparatus as defined in claim 1, wherein said first means comprises an electrically actuatable heater means positioned to transfer heat to said spike.

6. A heat sealing apapratus as defined in claim 5, including means to regulate the current supplied ot said heater.

7. A heat sealing apparatus as defined in claim 5, wherein said heater means is around said spike.

8. A heat sealing apapratus as defined in claim 5, wherein the said base is provided with a hollow; said electric heater means being within said hollow.

No references cited.

EARL M. BERGERT, *Primary Examiner.*

D. J. DRUMMOND, *Assistant Examiner.*